Dec. 14, 1926.　　　　　　　　　　　　　　　1,610,524
P. G. HIDDLESON
CASK HEAD CUTTER
Filed Dec. 10, 1924　　　4 Sheets-Sheet 3
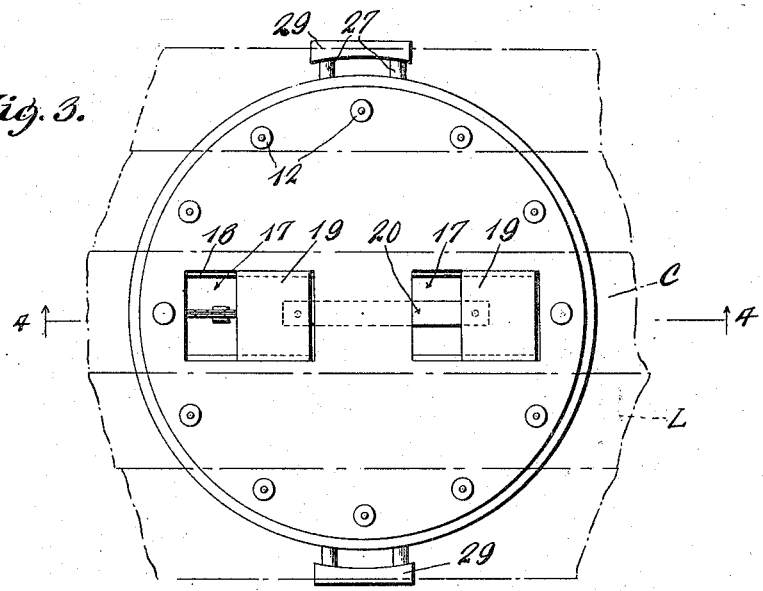
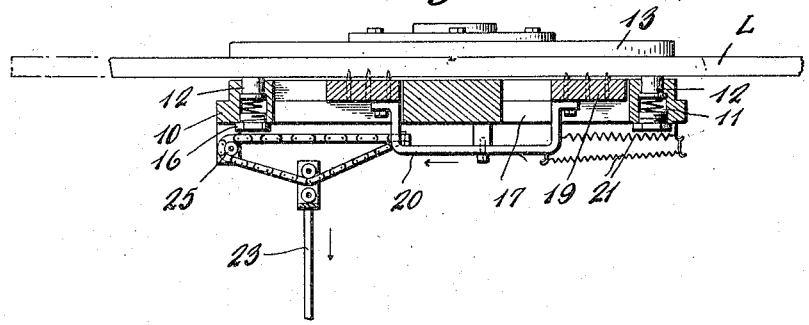
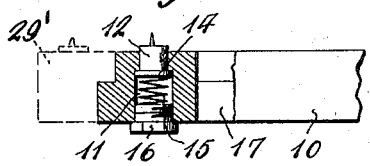
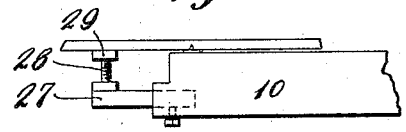
INVENTOR.
Philip G. Hiddleson
BY John A. Bommhardt
ATTORNEY.

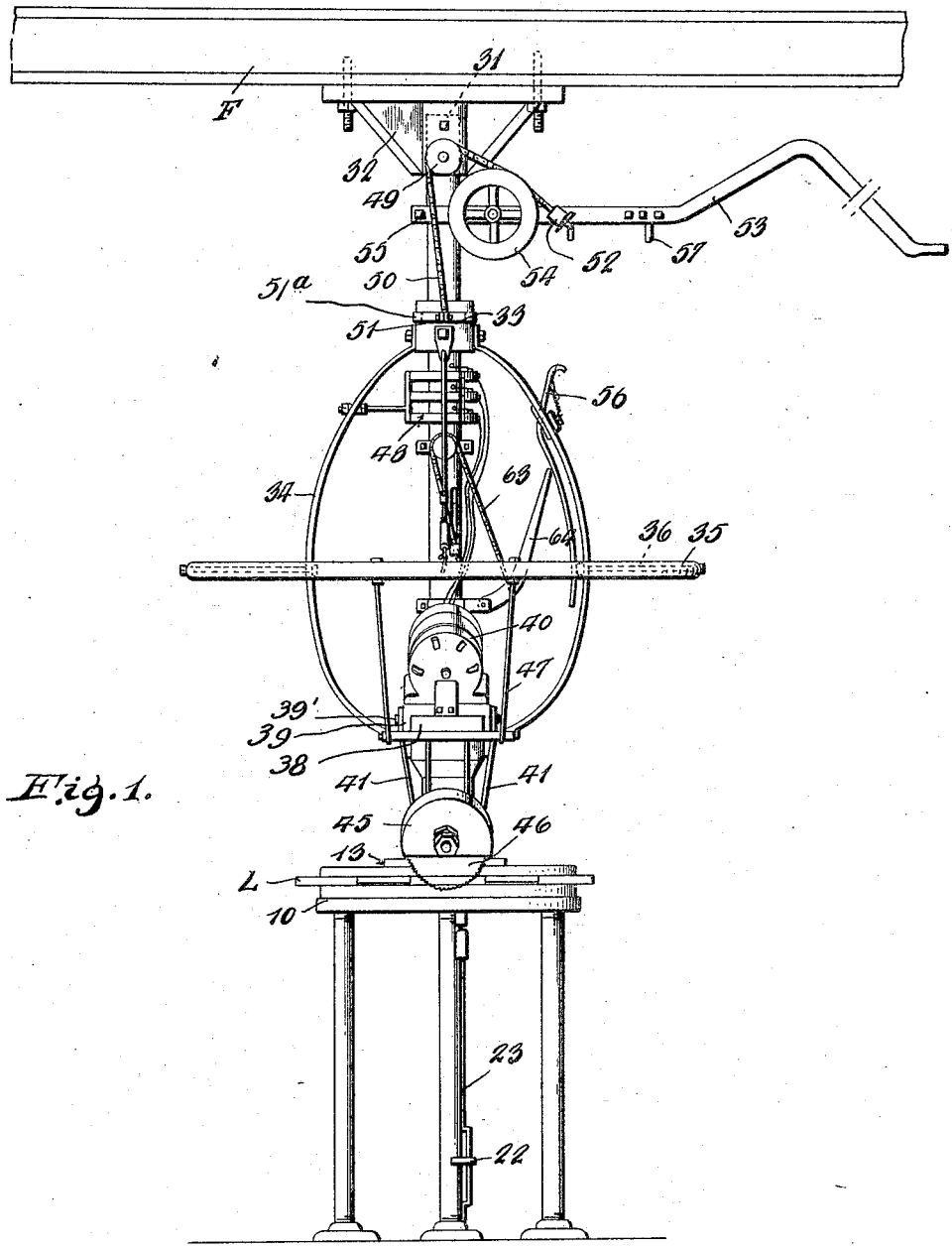

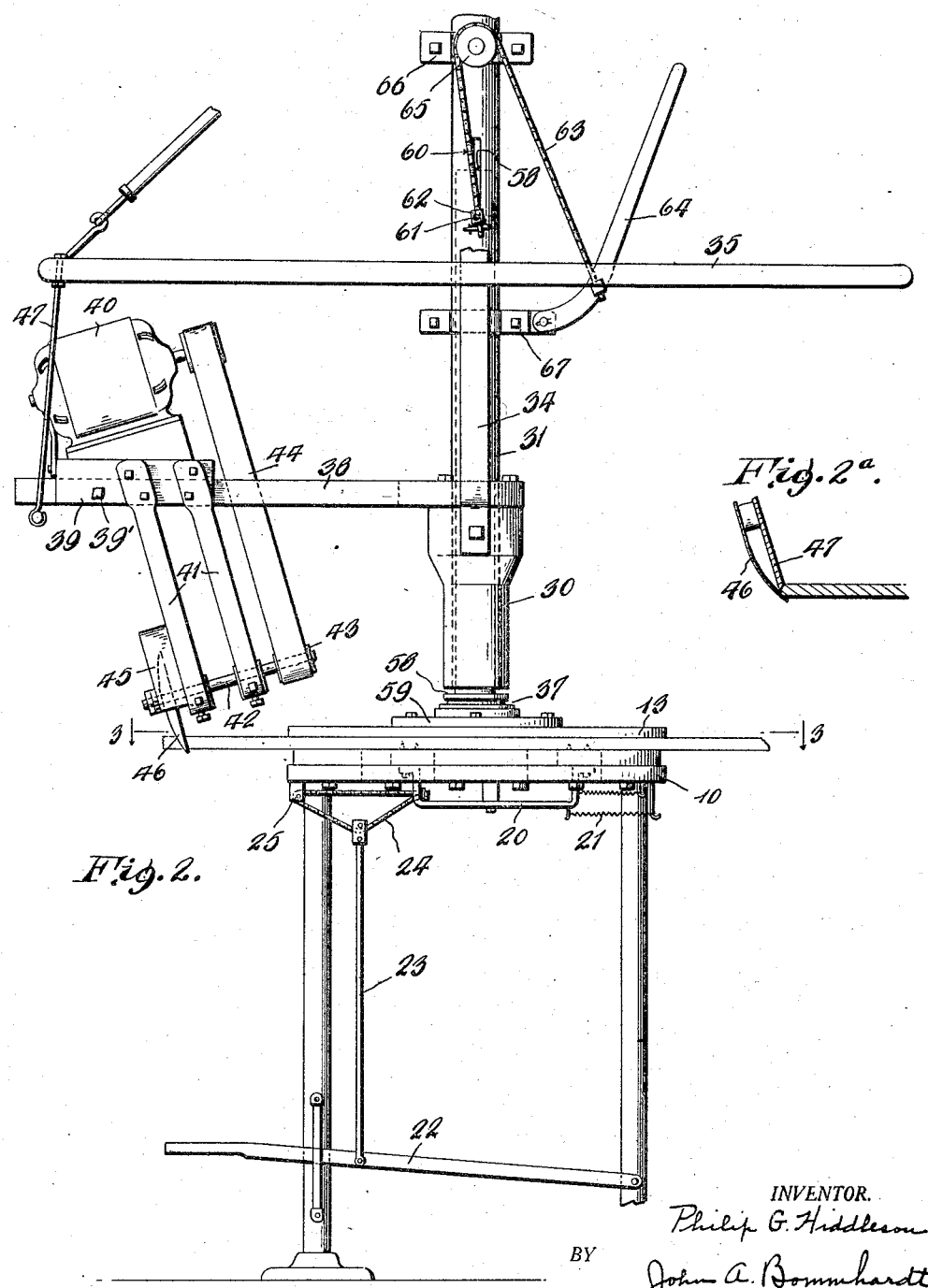

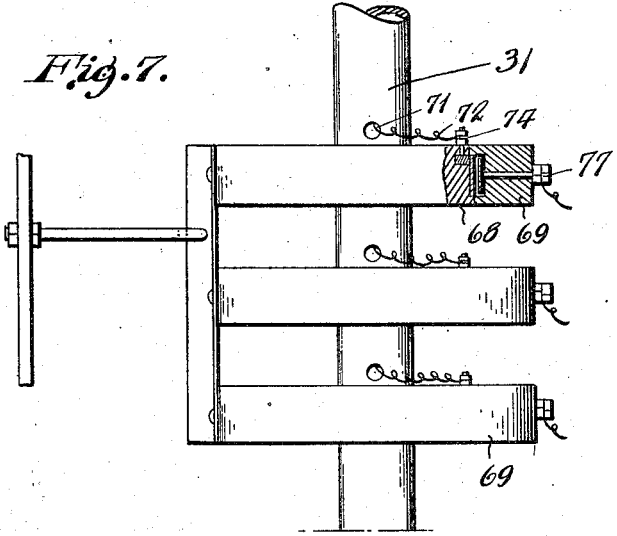
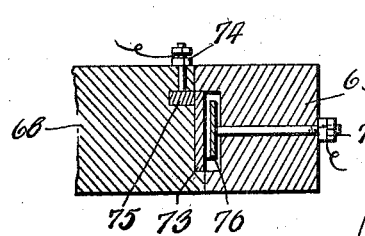
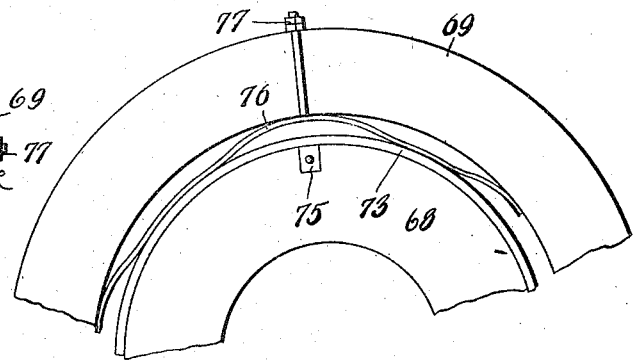

Patented Dec. 14, 1926.

1,610,524

UNITED STATES PATENT OFFICE.

PHILIP G. HIDDLESON, OF SALEM, OHIO, ASSIGNOR TO EDWARD E. ENDERLIN, OF SALEM, OHIO.

CASK-HEAD CUTTER.

Application filed December 10, 1924. Serial No. 754.988.

This invention relates to improvements in cask head cutters having for an object to provide a cutter through the use of which odd pieces of lumber as well as first grade pieces may be used in making up cask heads.

A further object is to provide a cask head cutter having a novel means for adjusting the several parts to permit the formation of vari-sized heads.

Another object is to provide a work holder of simple construction such as will reliably support pieces of lumber in accurate relative position for the formation of clean cut cask heads.

A still further object is to provide a work holder for supporting the several pieces of lumber from which a cask head is made and to permit relative shifting of one piece of the lumber to permit proper positioning of the cutting saw in the first instance.

It is likewise an object to provide a novel take-off whereby current is continually fed to a motor which drives a rotary saw.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1 is a side elevation of a completely assembled cask head cutter constructed in accordance with my invention;

Figure 2 is a detail side elevation taken substantially at right angles to that shown in Figure 1;

Figure 2ª is a detail of the manner in which the cask head is cut;

Figure 3 is a view taken substantially on the line 3—3 of Figure 2;

Figure 4 is a sectional view taken substantially on the line 4—4 of Figure 3;

Figure 5 is a detail section showing the spurs or grippers;

Figure 6 is a detail view showing an auxiliary support which I associate with the main work holder;

Figure 7 is a detail elevation partially in section showing the arrangement of the current take-off.

Figure 8 is a fragmentary plan view of one of the sections shown in Figure 7; and Figure 9 is a detail sectional view showing the relation of the inner and outer collars of each segment.

Having more particular reference to the drawings throughout which similar characters of reference designate similar parts, this improved cask head cutter may be broadly stated as comprising a main frame F (not completely shown), a work holder having means for automatically positioning the work for cutting; a motor driven rotary saw adapted for circular movement around the periphery of the work holder, and mechanism for relieving the work holder of the weight of the motor and associated parts to permit separation of the holder and removal of the completely cut cask head.

Work holder or saw table.

The work holder or saw table comprises a disc-like base portion 10 which is preferably made up of heavy metal and is provided near its periphery with a set of circumferentially spaced openings 11 in which are disposed spring pressed spurs 12. These spurs are adapted to engage the lower faces of the strips of lumber L and move them into snug engagement with the lower or inner face of the top clamp member 13 of the work holder to insure perfect cutting of cask heads. Each spur consists of a body portion having a headed inner end 14 which engages a shoulder formed in the opening 11, said head and shoulder being yieldably inter-engageable through the action of an expansion coil spring 15 whose tension is variable through adjustment of a screw-plug 16 as is clearly shown in Figures 4 and 5. Certain of these grippers are formed without the pointed upper ends for reasons which will be immediately pointed out. Obviously variation in the means for mounting the body portion may be resorted to.

At the beginning of the sawing operation, it is often difficult to give the saw a proper start and in order to correct this fault I provide means whereby the centrally disposed strips or strips of lumber may be shifted to permit the saw to obtain a suitable start through engaging the vertical edge of one of the strips of lumber which lie adjacent the central strip. This is accomplished through providing the base portion 10 of the work holder with a pair of elongated alined diametrically disposed slots 17 as shown in Figures 3 and 4. Each of these slots is provided with a pair of horizontally alined shoulders 18 which are designed to slidably support gripping blocks 19, these blocks being inter-connected for unitary movement by means of a substantially U-shaped connecting bar 20 as shown in Figure 4. These blocks 19 are normally held in fixed position with respect to the remaining structure through the provision of a pair of pull springs 21 as shown in Figures 2 and 4, thereby reliably and yieldably retaining the gripping blocks against accidental movement. When it is desired to shift these blocks to accomplish the above stated operation, a treadle 22 is depressed and through a link connection with a sprocket chain 24 or the like as illustrated in Figure 2, this movement is readily effected. This sprocket chain has its two ends secured to the connecting bar 20 and has its intermediate portions carried over a roller 25 which is supported from the base 10 and is associated with the upper end of the link 23 as clearly illustrated in Figure 4. It is obvious that with downward movement of the treadle 22 the lower portion of the chain will be moved downwardly and consequently shift the gripping blocks 19 radially and effect movement of the central strip of lumber to permit suitable positioning of a cutting saw. At times it is desirable to provide additional support for the edge portions of the strips of lumber from which the cask heads are being cut and for this purpose I provide as shown in Figures 3 and 6, auxiliary arms which are radially and vertically adjustable. Each arm consists of a pair of spaced bars 27 which are slidable in sockets formed in the base 10 and which carry in their outer ends threaded nipples 28 by means of which the supporting bar 29 may be elevated.

As a means for permitting the cutting of large cask heads I provide a set of auxiliary rings 29' each of which is formed as indicated in dotted lines in Figure 5. It is obvious that the provision of such rings each of which is equipped with the heretofore described spurs, will permit formation of vari-sized heads.

*Rotatable saw supporting and adjusting mechanism.*

This mechanism is associated with and arranged above the work holder and consists of a hub 30 which is rotatable upon the lower end of a fixed tubular casing 31, whose upper end is bolted or connected in some other manner to a head member 32 as shown in Figure 1 of the accompanying drawings. A rotatable collar 33 is mounted upon the casing 31 at a point spaced above the hub 30 and is connected with said hub by means of curved arms or bars 34 as clearly shown in Figure 1. A hand rail 35, as shown in Figures 1 and 2 is spaced from the medial portions of the curved arms or bars 34 and connected therewith by means of short rods 36, this structure providing for unitary rotation of the hub 30, collar 33 and said arms 34 with respect to the casing 31. A thrust bearing 37 is arranged between the lower end of the hub 30 and the top clamp member 13 to support the weight of said hub and the parts associated therewith and allow for free rotation upon the work holder.

A radially adjustable cutting device is rotatable about the periphery of the work holder through the provision of a radial arm 38 whose inner end is bolted to the upper end of the headed portion of the hub 30, said arm being vertically slotted for the belt 44 which runs through the slots. A substantially inverted U-shaped slide member 39 straddles the arm 38 and mounts an electric motor 40, said motor and slide being movable upon the arm 38 and lockable at any point through adjustment of a bolt 39' or the like which engages the supporting arm. Pairs of downwardly extending brackets 41 are secured to the opposite longitudinal faces of the slide member 39 and support at their lower ends a short shaft 42 which carries a pulley 43 rotatable by means of a belt 44 driven from a pulley mounted upon the electric motor as shown in Figure 2. A pair of saws is fixed to the opposite end of the shaft 42, and are partially enclosed in a housing 45 for obvious reasons. One saw 46 is of greater diameter than the other saw 47 and is designed to function with the latter to form a double bevel at the periphery of a cask head as illustrated in the detail view in Figure 2ª. The outer end of the motor supporting arm 38 is connected to the hand rail 35 by means of stay rods 47 as indicated in Figure 2.

An electric take-off device 48 is associated with the upper portion of a casing 31 as shown in Figure 1 and provides for continuous feeding of electric current to the saw driving motor at all times. In order to provide for elevation of the saw and parts fixedly associated therewith I arrange upon the head 32 one or more pulleys 49 over which a sprocket chain 50 is trained, one end being connected to ears 51 carried by a swiveling ring 51ª on the collar 33 while the other end is attached to a block 52 carried by a hand lever 53 as illustrated in Figure 1. An idle pulley 54 is arranged between the first named pulley and the point of connection between the chain and lever 53, said pulley 54 being mounted upon a supporting collar 55 which also serves as a support to which the inner end of the lever 53 is pivoted, said collar being clamped around the tubular casing 31.

It is quite clear from the above that with the parts positioned as shown in Figure 1, the saw and associated elements may be readily elevated through depression of the lever 53, this lever movement serving to lift the collar 33, hub 30 and simultaneously raise the remaining elements which are connected thereto. It is also apparent that the elevation of these parts will relieve the top clamp members 13 of the weight of said parts, such weight being utilized to reliably clamp boards or the like in the work holder during the sawing operation. In order to retain the saw in elevated position I provide a pivoted hook 56, engageable with a finger 57 carried by the operating lever 53 as shown in Figure 1, said hook being mounted upon one of the curved arms 34.

The above operation having been completed it is now necessary to raise the top clamp member 13 before the finished cask head can be removed from the work holder and in order to attain this I provide a top clamp lifting device.

Top clamp lifting device.

This device consists in the provision of a relatively short shaft 58 within the hub 30 and casing 31 as shown in dotted lines in Figure 2 of the accompanying drawings. The lower end of this shaft 58 is fixed to the top clamp member 13 through the arrangement of a flange plate 59 as shown and standard well known elements. The upper end portion of the shaft 58 extends considerably above the hand rail to provide a suitable bearing area to prevent slapping of the parts during the operation period. The aforementioned casing 31 is slotted as shown at 60 to permit the arrangement of a transverse bolt or key 61 whose opposite ends carry blocks 62 to which a chain or chains 63 may be keyed. This chain or chains as the case may be, have connection with the inner end portion of the hand lever 64 as shown in Figure 2, the intermediate portions of the chain or chains being trained over one or more pulleys 65 fixed to a collar 66 mounted upon the casing 31. The inner end of the hand lever 64 is pivoted to a collar 67 spaced below the slotted portion 60 of the casing 31 and it is obvious that with downward movement of said lever the shaft 58 will be elevated and carry with it the top clamp member 13. With this operation it is clear that the finished cask head may be readily removed from the work holder. With sufficient downward movement of the lever 64 it will pass dead center and automatically lock itself in such downward position with the result that the operator will be free to use both hands in completion of his work.

Operation.

The hand lever 53 is first depressed in order to raise the hub 30, the saw and other parts with the result that the shaft 58 and top clamp member 13 remain in their original positions, it being understood that the first named parts are vertically slidable on said shaft 58. The lever 64 is then depressed and effects vertical movement of the shaft 58 within the casing 31 and consequently separates the top clamp member 13 from the base portion 10 of the work holder. At this point the several strips of lumber to be employed in making up the cask head are arranged upon the base portion 10 as illustrated in Figure 3 of the accompanying drawings, said strips being shown in dot and dash lines. The aforementioned levers 53 and 64 are lifted, the lever 64 being the first one, and thereby effects a reliable clamping action upon the strips from which the cask head is to be formed. At this point the holder and saw must be adjusted to determine the dimensions of the cask head being formed. This is accomplished through moving the slide member 39 upon the arm 38 as is obvious. Proper and satisfactory entry of the saws into the strips is effected through depression of a treadle 22, which as is obvious from a study of Figures 3 and 4, will move the central strip C to one side thereby allowing the saw to cut directly into the vertical edge of the next adjacent strip of lumber. It is clear that such shifting of the central strip C will allow for the formation of a clean cut uniform cask head. Rotation of the saw and associated parts around the work holder is effected through the operator's gripping of the hand rail and moving it circumferentially as is quite clear. With completion of the sawing, the first named actuation of the levers 53 and 64 is effected with the results as previously stated.

Electric current take-off.

In a structure such as heretofore set forth current must be continuously supplied to the electric motor and in order to insure against breaking of the circuit at any points I provide a take-off which consists of pairs of inner and outer fibre collars 68 and 69 respectively. Obviously any number of the pairs may comprise a set, the number being dependent upon the type of motor to which the current is supplied. The inner fibre collar 68 is fixed to a casing 31 which is provided with radial openings 71 through which current conducting wires 72 enter said casing. A contact or take-off ring 73 is fixed to the periphery of the inner collar 68 and is designed for electrical connection with a conductor 72 through the arrangement of a terminal post 74 whose inner end is attached to a block 75 having electrical connection to said contact strip 73.

The outer fibre insulating ring or collar has its inner wall channeled for the reception of a spring ring 76 which can be made of brass or any other efficient electrical current conducting material. This spring 76 as shown in Figure 8 is connected to a terminal post 77 and is so bent as to alternately contact with the take-off ring 73 and with the outer fibre collar 69. This arrangement provides for yieldable engagement between the take-off ring 73 and the spring ring 76, thereby eliminating the possibility of broken circuits at any time. Obviously the outer collar is arranged to rotate upon the inner collar as shown.

Manifestly, the construction shown is capable of considerable modification and such modification as may fall within the scope of my claims, I consider within the spirit of my invention.

I claim:

1. A work holder comprising a base, a top clamping member, devices carried by the base to uniformly engage the work with the top clamping member, gripping devices slidably carried by the base to grip the work, and means for laterally shifting said gripping devices to move a portion of the work.

2. A work holder comprising a base, a top gripping member, yieldable devices carried by the base to uniformly engage the work with the top clamping member, said base having diametrically alined spaced slots, work gripping blocks slidable in said slots to shift laterally certain portions of the work, and a treadle having connection with the blocks and adapted to be operated to move said blocks.

3. A work holder comprising a base, a top clamping member yieldable devices carried by the base to uniformly engage the work with the top clamping member, said base having diametrically alined spaced slots, work gripping blocks slidable in said slots to shift radially certain portions of the work, a bracket connecting said blocks, a treadle arranged to move the blocks and spring means for returning the blocks to their original position.

4. A work holder comprising a base, a top clamping member, yieldable devices carried by the base to uniformly engage the work with the top clamping member, said base having diametrically alined spaced slots, work gripping blocks slidable in said slots to shift laterally certain portions of the work, a bracket connecting the blocks, a support spaced from one end of said bracket, a roller carried by said support, a flexible element extending over the roller and having its ends connected to the bracket, a treadle, a link connecting the treadle and portions of said chain to transmit sliding motion to the blocks with depression of the treadle, and means for returning the blocks to the original position.

5. A work holder comprising a base, a top clamping member, devices carried by the base to uniformly engage the work with the top clamping member, said base having spaced alined slots, spur carrying gripping blocks slidably arranged in said slots, a bracket inter-connecting said blocks, means arranged to transmit movement to the blocks, and spring means adapted to return the blocks to their normal positions.

In testimony whereof, I affix my signature.

PHILIP G. HIDDLESON.